Nov. 27, 1956   G. SBORLINO   2,772,127
BEARING MOUNTING AND METHOD OF MAKING SAME
Filed June 24, 1952

INVENTOR.
G. Sborlino
BY
ATTYS.

United States Patent Office 2,772,127
Patented Nov. 27, 1956

2,772,127

BEARING MOUNTING AND METHOD OF MAKING SAME

Gino Sborlino, Milan, Italy, assignor to Loro & Parisini Societa per Azioni, Milan, Italy, a firm Application June 24, 1952, Serial No. 295,255

Claims priority, application Italy June 30, 1951

2 Claims. (Cl. 308—178)

It is known that if a stable coupling is required for the outer race of a ball or roller bearing in the seat destined therefor, this seat is reamed to a diameter smaller than the outer diameter of said race; the introduction of the bearing into the support, therefore, requires forcing said race into its seat. In the cases, in which a very tight or locked coupling is required, recourse must be had to a press for mounting or the support must be previously heated and then the mounting effected or forced in a conical bore.

In certain cases, especially if the bearings have larger dimensions, these operations are not very easy, because special tools are necessary every time mounting or dismantling has to be carried out and, moreover, they require most accurate precision working of the seat for the bearing, which is not an easy thing to be made with large pieces or machine bedplates.

The method according to the present invention eliminates almost completely the difficulties of working and, for mounting and dismantling, it does not require any special tools, making extraction and introduction of the bearing easy and ensuring its perfect and safe fixing in its seat. It consists in pre-arranging a bush having a bore equal to the outer diameter of said race of the bearing and a longitudinal cut; also the seat is prepared in the support in a manner adapted to receive said bush, there being provided means for tightening said bush on the outer race of said bearing; subsequently the bush is mounted on the bearing and the whole is introduced into the seat previously prepared, whereafter tightening is performed at last with means which too have previously prepared.

Figure 1:
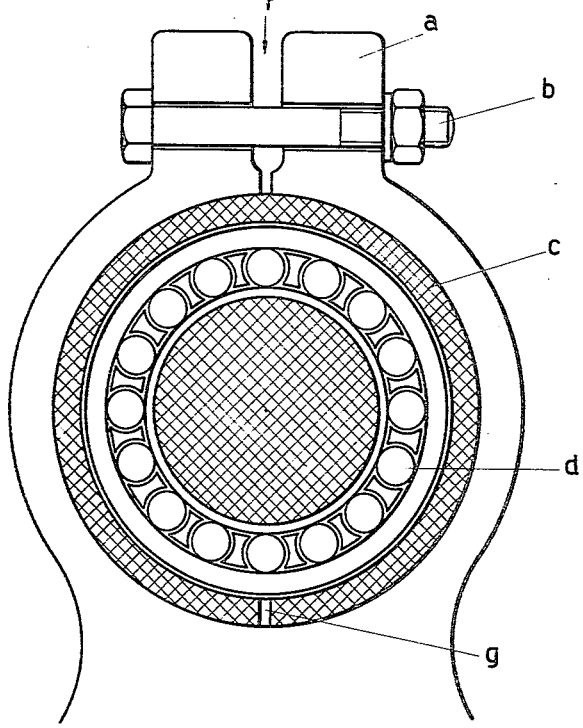
Figure 2:
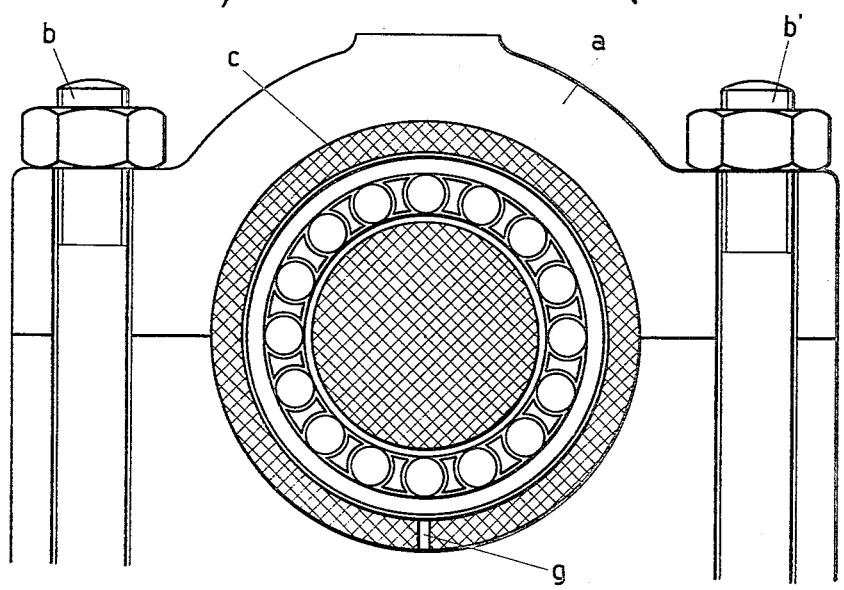

With reference to Figures 1 and 2 of the accompanying drawing, the bearing $d$ is introduced into the bush $c$, which has a bore accurately equal to the outer diameter of the bearing, carries a longitudinal cut $g$ in such a manner that utilizing the elasticity of the material it facilitates both the introduction and extraction of the bearing.

The fixing of the bushes in the seat of the support or bedplate can be effected in various manners, e. g. as shown in Fig. 1 by clamping, where if the bolt $b$ is tightened, the whole remains rigidly locked, or as shown in Fig. 2, by means of the cap $a$ fixed with two bolts $b$ and $b'$.

To get sure that this fixing operation be performed without any deformation of the bush $c$ and to impart only slight compression to the bearing without causing its deformation, it is necessary for the longitudinal cut $g$ to be placed as shown in Figs. 1 and 2. In both cases, it must be placed in the part opposite to the fixing bolts.

For dismantling, it suffices to loosen the bolts $b$ (see Fig. 1) and to open with any means of the cut $f$ in such a manner as to diverge the two jaws and to extract the bush $c$.

In the case of Fig. 2 it will suffice to remove the cap $a$. Operation is the same for extraction of the bearing from the bush, widening the cut $g$.

With this new method, the machine is rendered much simpler constructively, especially if the seats for the bearings are in heavy pieces such as: bed-plates, framings, requiring much space and difficult to be machined.

In this case it suffices to create seats for bushes with a medium working grade instead of working surfaces to high precision and perfect finish, as is required at the present time with conventional methods.

The parts to be very carefully treated will be the bushes forming the seats for the bearings; now, as these bushes are usually smaller pieces and, therefore, easier to be tackled, they can be clamped on machine tools more suitable for attaining precision.

This process may be used to great advantage with machines subject to heavy strain and strong vibrations, such as crushers, roller mills or roll crushers, rolling mills etc. which require safe and accurate locking of the bearings.

What I claim is:

1. A method of mounting in a support a conventional ball or roller bearing having an inner, continuous race ring, a series of rolling bodies and an outer, continuous race ring, which comprises machining the inner face of a cylindrical member, to produce a machined bore having a diameter substantially equal to the outer diameter of said outer race ring, producing a single longitudinal slit in said member, mounting the bearing in said bore, providing the support with a longitudinally slit cylindrical seat having a diameter substantially equal to the outer diameter of said cylindrical member and having a medium working grade inner surface, mounting said member in said seat with the slit in said member spaced remote from the split in said cylindrical seat, and reducing the diameter of said seat to tighten the support about said member.

2. In a device for mounting a conventional ball or roller bearing, the combination of a support provided with a bifurcated portion adapted to form a cylindrical seat; an elastic cylindrical bush having a single longitudinal slit and a machined inner face adapted to receive said bearing thereagainst, said bush being mounted in said support with said slit being arranged remote from the bifurcated portion, and means adapted to reduce the diameter of said seat to effect clamping of said bush in said member.

References Cited in the file of this patent

UNITED STATES PATENTS

| 827,865 | Harris | Aug. 7, 1906 |
| 937,811 | Jenkins | Oct. 26, 1909 |
| 1,498,748 | Pierce | June 24, 1924 |
| 1,513,562 | Swanson | Oct. 28, 1924 |
| 2,016,924 | Herrmann | Oct. 8, 1935 |
| 2,489,802 | Needham | Nov. 29, 1949 |
| 2,624,105 | Virtue | Jan. 6, 1953 |